United States Patent

[11] 3,615,704

[72] Inventor Knud George Pedersen
 Birkerod, Denmark
[21] Appl. No. 687,661
[22] Filed Dec. 4, 1967
[45] Patented Oct. 26, 1971
[73] Assignee Slagteriernes Forsknings-Institut
 Roskilde, Denmark
[32] Priority Dec. 9, 1966
[33] Denmark
[31] 6389

[54] METHOD OF INJECTING PICKLING MEDIUM INTO FOODS
 2 Claims, 1 Drawing Fig.
[52] U.S. Cl..................................................... 99/159, 99/257
[51] Int. Cl..................................................... A23b 1/01
[50] Field of Search............................................ 99/159, 254, 255, 256, 257

[56] References Cited
UNITED STATES PATENTS

| | | | |
|---|---|---|---|
| 2,629,311 | 2/1953 | Graves ......................... | 99/159 X |
| 2,742,367 | 4/1956 | Bachert......................... | 99/159 |
| 3,296,953 | 1/1967 | Bjorn-Henriksen et al... | 99/256 |

Primary Examiner—Hyman Lord
Attorney—Waters, Roditi, Schwartz & Nissen

ABSTRACT: A method of an apparatus for injecting a preservative or pickle such as brine into foods through injection needles or nozzles and by which the food is compressed and the injection made under simultaneous expansion of the food, said process being carried out in an apparatus with a closed chamber from which the food after the injection is moved directly to a container without allowing any substance of nutritious value to escape from the food.

PATENTED OCT 26 1971 3,615,704
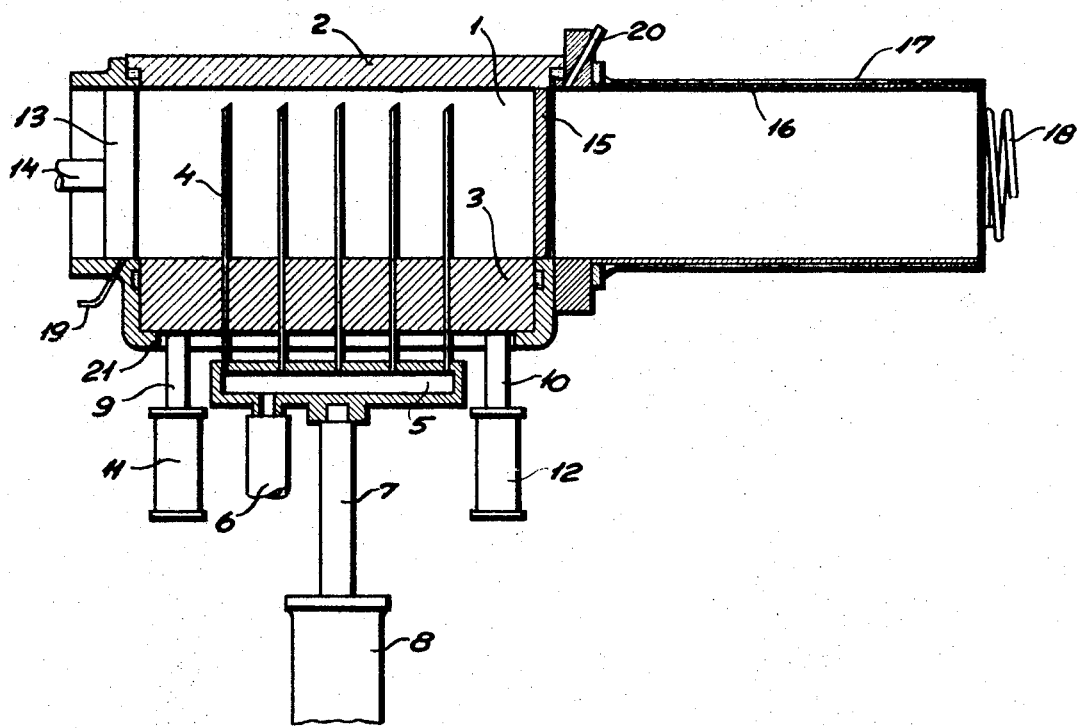

METHOD OF INJECTING PICKLING MEDIUM INTO FOODS

The invention relates to a method of curing foods by injecting a pickling medium such as brine into the food through one or more injection needles. This form of preservation has been introduced in order to reduce the time of treatment for foods, particularly meat, because it was desirable to avoid long storage in a salting vessel, which required both time and space, besides which parts of the valuable substances contained in the food oozed out into the brine and was lost. But it was found to be difficult by such direct injection to introduce the proper quantity of brine to ensure effective preservation without using an excess of brine. In many cases, for instance, undesirable quantities of brine were introduced into the meat.

It is the object of the present invention to provide a method by which these disadvantages have been overcome and by which it is possible to preserve foods by means of brine or pickle in a rapid and effective manner which is suitable for mass production and particularly in the production of preserved foods, which are to be stored in closed containers after the injection.

By the method in accordance with the invention, the food is compressed, preferably under evacuation and subsequent release of vacuum, after which the brine is injected while the food is simultaneously allowed to expand to a predetermined volume. It will be appreciated that the amount of brine to be introduced into the food is determined by the resultant expansion, and it is, therefore, the desired amount of brine per se that causes the injection to be discontinued when the stipulated volume has been reached. This method has proved to be very effective because the most beneficial concentration and quantity of brine to be used for any given amount of food can be readily determined by tests, and the method therefore also results in a finished product of a shape and condition suitable for storing in containers of standard size.

By the combination of compression and evacuation it has further been achieved that the brine will rapidly penetrate from the needles to all parts of the food so that the preservation becomes effective at once throughout the entire volume of the treated food.

The invention also relates to an apparatus for carrying out the method and of the type comprising an injection assembly with a plurality of brine-injection needles, said assembly being movably mounted for permitting the needles to be introduced into an article of food disposed on a base. In accordance with the invention the said base forms one sidewall of a chamber which can be opened and closed, and which is connected to means for evacuating the chamber and is provided with at least one displaceable wall for compression of the food so that it substantially fills up the chamber, one displaceable wall being adapted to be moved backwards by a distance determined by arresting members for increasing the volume of the chamber during the injection of brine. By constructing the apparatus in this manner, the food can in a simple manner be compressed to a suitable form, preferably as a parallelepiped, and when the brine has been introduced the parallelepiped will have a size and form suitable for being deposited in a container.

Simultaneously with the injection of the brine, an expansion of the food will occur, and the total volume of brine will therefore be absorbed in the food, and the valuable substances contained in the food will have no chance of oozing out, so that both the taste and nutritional value will be preserved in the best possible manner.

In a particularly convenient embodiment of the apparatus according to the invention, the needles extend from a brine reservoir disposed under the base and connected to a brine pressure source; the needles are here passing through the base and are displaceable relative thereto. Thus, it has in the simplest manner been rendered possible to deposit the food in the chamber and manipulate the movable wall or walls, while the said brine reservoir will cause the injection of the brine to be distributed evenly through all of the needles.

In another embodiment a further simplification of the apparatus has been achieved by making the base displaceable in cooperation with the said arresting members, whereby the base per se will form the displaceable wall of the chamber.

In a preferred embodiment of the apparatus according to the invention, one of the chamber walls is adapted to be removed by planar displacement, while the opposite wall is formed as a piston associated with moving means for advancing the piston through the chamber, and adjacent to the removable wall there are means for retaining a can with the open end in engagement with the chamber. In this manner it will be possible to remove the food from the chamber easily and rapidly when the injection of brine has been completed.

In another expedient embodiment of the apparatus according to the invention, the can-retaining means comprise a tube section communicating with the chamber and the outer cross-sectional shape of which is substantially the same as the inner cross-sectional form of the can, and the piston displacement member is adapted to force the piston through at least approximately the entire length of said tube section, at the same time disengaging the can, preferably against friction or against the action of a resilient abutment. Thus the food can be fed directly from the chamber to the can or jar, which will be sealed immediately to make sure that the content of valuable substances in the food are retained in the container so that the food in the container will in every respect be identical with the original food plus brine.

It will moreover be convenient, according to the invention, to provide the said tube section with a vacuum-supply opening disposed adjacent to the displaceable wall, so that the said tube section is subject to vacuum when the communication between the chamber and the tube section is opened, whereby the introduction of the food into the can is facilitated since there will be no air to be displaced by the meat.

The invention will be explained in the following with reference to the drawing, which schematically illustrates a cross section through an apparatus according to the invention.

The drawing shows an apparatus comprising a chamber 1, covered by a tight-sealing lid 2 and the lower wall of which is a piston 3, through which is carried a plurality of injection needles 4 extending from a brine reservoir 5, to which brine is supplied under pressure through a tube line 6 and which is secured to a piston rod 7 of a hydraulic cylinder 8. The piston 3 is supported by two piston rods 9 and 10 of hydraulic cylinders 11 and 12 respectively.

One end wall of the chamber is formed by a piston 13 attached to a piston rod 14 extending from a hydraulic cylinder which is not shown. The opposite end wall is a displaceable panel 15 which can be displaced to open the chamber across its entire cross-sectional area to provide access for the piston 13 and permit it to travel through the whole length of the chamber and into a tube section 16 having the same inner cross section as the chamber 1 in the position shown and serving to hold a container 17 drawn over the tube section 16 and urged towards the chamber 1 by means of a spring 18.

The chamber, moreover, is provided with a vacuum line 19, and to the interior of the tube section 16 leads a second vacuum line 20.

When the apparatus is put into use, the food, preferably meat, is stuffed in the chamber 1 to fill up the chamber approximately, on which the lid 2 is put on, and the meat is compressed by carrying the piston 3 upwards, while simultaneously, air is sucked out of the chamber through the line 19. During this operation the piston 13 is slightly retracted to provide communication between the vacuum line and the interior of the chamber, and on completion of the compression and air suction the piston 13 is advanced to the position indicated. Thereby the evacuation is discontinued, and the injection needles are inserted into the meat by means of the hydraulic cylinder 8 to the position indicated; brine is fed through the supply line 6, the reservoir 5 and the needles 4, and simultaneously the pressure applied to the cylinders 11 and 12 is cut off to permit the brine to cause an expansion of the volume of the meat and thereby urge the piston 3 downwards into contact with an abutment 21. When therefore the desired compression of the meat has been determined, the volume of brine will be determined exactly by the reverse movement of the piston 3, and the needle assembly can be withdrawn by means of the hydraulic cylinder 8. The meat will now be substantially permeated by brine, and the vacuum that existed in the chamber will cause the distribution of the brine throughout the mass of meat.

The displaceable wall 15 is now withdrawn, and by means of the piston 13 the mass of meat is pressed out of the chamber 1 into the tube section 16 and further out until the continued movement of the piston 13 will urge the container 17 away from the tube section 16 against the pressure of the spring 18, and when the container has been released completely from the tube section, the meat will be disposed in the container, without any brine or juice having escaped from the meat, which will be enclosed in the container with its full content of brine, juice and valuable nutritious matter. The container may then be sealed directly and later subjected to heat treatment in an autoclave if this is desired.

What we claim is:

1. A method of injecting a pickling medium into food comprising filling a chamber with food, said chamber having a movable bottom wall, a movable end wall, and a displaceable opposite end wall serving to hold a packaging container with the open end thereof in engagement with said chamber, sealing the food filled chamber with a tight-sealing lid, moving the bottom wall upwardly to compress the food in said chamber while simultaneously evacuating the air therefrom, discontinuing said evacuation when the food has been compressed to a volume less than that of the packaging container, passing pickle injecting needles through the bottom wall into the compressed food, injecting a pickling medium into said food through said needles whereby the pickling medium is distributed throughout the compressed food while causing an expansion in the volume of the food to a predetermined volume corresponding to the volume of the packaging container thereby moving the bottom wall downwardly, removing the displaceable end wall of the chamber to open said chamber across its entire cross sectional area, moving the opposite end wall through the length of the chamber to push the food therefrom into the packaging container, and sealing the same.

2. A method as set forth in claim 1 wherein the pickling medium is brine and the food is meat.